(12) United States Patent
Battistello et al.

(10) Patent No.: US 9,680,645 B2
(45) Date of Patent: Jun. 13, 2017

(54) INTEGRITY VERIFICATION OF CRYPTOGRAPHIC KEY PAIRS

(71) Applicant: OBERTHUR TECHNOLOGIES, Colombes (FR)

(72) Inventors: Alberto Battistello, Colombes (FR); Christophe Giraud, Colombes (FR); Guillaume Dabosville, Colombes (FR); Laurie Genelle, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/572,233

(22) Filed: Dec. 16, 2014

(65) Prior Publication Data

US 2015/0172051 A1 Jun. 18, 2015

(30) Foreign Application Priority Data

Dec. 17, 2013 (FR) ...................................... 13 62833

(51) Int. Cl.
*H04L 9/00* (2006.01)
*H04L 9/14* (2006.01)
*H04L 9/30* (2006.01)

(52) U.S. Cl.
CPC ................ *H04L 9/14* (2013.01); *H04L 9/002* (2013.01); *H04L 9/30* (2013.01); *H04L 9/3046* (2013.01); *H04L 2209/24* (2013.01)

(58) Field of Classification Search
CPC ....................................................... H04L 9/14
USPC .......................................................... 726/26
See application file for complete search history.

(56) References Cited

U.S. PATENT DOCUMENTS

| | | | | |
|---|---|---|---|---|
| 7,437,568 | B2* | 10/2008 | Das-Purkayastha | G06F 21/552 380/277 |
| 7,512,231 | B2* | 3/2009 | Okeya | G06F 7/723 380/28 |
| 2008/0240443 | A1* | 10/2008 | Vuillaume | H04L 9/3247 380/277 |

OTHER PUBLICATIONS

Donald L Evans et al: "FIPS Pub 140-2: Security Requirements for Cryptographic Modules", Federal Information Processing Standards Publication, Mar. 12, 2002 (Mar. 12, 2002), pp. i-61, XP055138700, Extrait de 1 I Internet: URL:http://csrc.nist.gov/publications/fips/fips140-2/fips1402.pdf [extrait le Sep. 8, 2014] * section 4.9.2.

F. Bao et al: "Breaking public key cryptosystems on tamper resistant devices in the presence of transient faults" In: "Field Programmable Logic and Application", Jan. 1, 1998 (Jan. 1, 1998), Springer Berlin Heidelberg, Berlin, Heidelberg, XP055138684, ISSN: 0302-9743 ISBN: 978-3-54-045234-8 vol. 1361, pp. 115-124, DOI: 10. 1007/BFb0028164, * Sections 2.4 et 3.5.

(Continued)

*Primary Examiner* — Longbit Chai
(74) *Attorney, Agent, or Firm* — Young & Thompson

(57) ABSTRACT

Method of integrity verification of cryptographic key pairs, the method including an integrity test with:
- at least one first step implementing one of the private and public keys and an initial test datum, the first step making it possible to generate a first result,
- at least one second step implementing at least the first result and the key not used during the at least one first step, the second step making it possible to generate a second result, and
- a comparison of the second result and of the initial test datum, characterized in that the test is re-executed upon each positive comparison, and in that the test is executed at least 2 times.

6 Claims, 2 Drawing Sheets

(56) References Cited

OTHER PUBLICATIONS

Jean-Sebastien Coron et al.: "Fault Attacks and Countermeasures on Vigilant's RSA-CRT Algorithm", Fault Diagnosis and Tolerance in Cryptography (FDTC), 2010 Workshop on, IEEE, Piscataway, NJ, USA, Aug. 21, 2010 (Aug. 21, 2010), pp. 89-96, XP031755390, ISBN: 978-1-4244-7844-6 * Section V *.
Camille Vuillaume et al: "RSA Key Generation: New Attacks" In: "Field Programmable Logic and Application", Jan. 1, 2012 (Jan. 1, 2012), Springer Berlin Heidelberg, Berlin, Heidelberg, XP055137811, ISSN: 0302-9743 ISBN: 978-3-54-045234-8 vol. 7275, pp. 105-119, 001: 10.1007/978-3-642-29912-4 9, * section 5 *.
FR Search Report, dated Sep. 8, 2014, from corresponding FR application.

* cited by examiner

INTEGRITY VERIFICATION OF CRYPTOGRAPHIC KEY PAIRS

The present invention relates to the field of digital information security. It relates more particularly to the securing of cryptographic methods implementing public and private key pairs.

BACKGROUND OF THE INVENTION

Certain cryptographic systems implementing methods such as for example the digital signing of a message or its encryption, require the generation of cryptographic key pairs. The public key is shared as plaintext by the cryptographic system with the addressee systems receiving the processed message whereas the private key is kept secret.

Generation of public and private key pairs being a sensitive operation, test mechanisms are usually provided for verifying their integrity.

For example, the American FIPS standard. 140-2 published by the NIST (the initials standing for "*National Institute of Standards and Technology*") provides for such a test (entitled "*pair-wise consistency test*").

In the case of cryptographic methods of RSA type (the initials standing for "*Rivest Shamir Adelman*"), the key pair is obtained in the following manner.

To obtain p and q, two large prime numbers, the following two steps are repeated:
- obtaining of two candidate numbers p and q on the basis of numbers drawn at random in the set $Z_n$ of the additive group of integers modulo n, and
- testing of the primality of the p and q candidates (for example according to a probabilistic primality test, for example of Miller-Rabin type, for example in accordance with FIPS standard 140-2, until a prime number is obtained.

The product of the numbers p and q thus forms a number n ($n=p \cdot q$).

Thereafter, the number $\Phi(n)=(p-1) \cdot (q-1)$ is computed. ($\Phi$ being the Euler indicator function, or "totient" as it is termed).

The public key is thereafter formed by the numbers n and e, with e, "the public exponent", being an integer such that:
$1 < e < \Phi(n)$, and
e and $\Phi(n)$ are mutually prime ($\gcd(e, \Phi(n))=1$, "gcd" being the initials standing for "greatest common divisor").

The private key, on the other hand, is formed by the numbers n and d, with d, "the private exponent", being an integer such that:
$d \cdot e = 1 \mod \lambda(n)$, with
$\lambda(n)$ being the least common multiple between p−1 and q−1 ($\lambda(n)=1 \, cm(p-1, q-1)$, "1 cm" being the initials standing for "least common multiplier").

When the cryptographic method is an encryption of a message m (m belonging to $Z_n$), the integrity test provided for by FIPS standard 140-2 can be summarized as follows:
1) the message m is encrypted with the public key so as to obtain an encrypted. message $c=m^e \mod n$,
2) the encrypted message c is decrypted with the private key so as to obtain a decrypted message $m'=c^d \mod n$, and
3) it is verified that the initial message m and the decrypted message are the same ($m'=m$).

When the cryptographic method is a signing of a message m (m belonging to $Z_n$), the integrity test provided for by FIPS standard 140-2 can be summarized as follows:

1) the message m is signed with the private key so as to obtain a signature $s=(m) \mod n$, (or optionally $s=(H(m))^d$, H being a hash function,
2) a value h' is computed as $h'=s^e \mod n$, and
3) it is verified that the value h' thus computed and the message m are the same (or optionally that the value h' and the digest of the message under the hash function are the same ($h'=H(m)$).

The inventors have however noted that the integrity tests currently used might not detect certain errors when generating pairs of keys. They have thus highlighted. a need to improve the reliability of the integrity verification methods for generating pairs of keys in cryptographic systems.

The present invention enters within this framework.

SUMMARY OF THE INVENTION

A first aspect of the invention relates to a method of integrity verification of public and private cryptographic key pairs, the method comprising the execution of an integrity test, in which the integrity test comprises:
- at least one first step implementing one of the private and public keys and an initial test datum, said first step making it possible to generate a first result,
- at least one second step implementing at least said first result and the key not used during the at least one first step, said second step making it possible to generate a second result, and
- a comparison of said second result and of said initial test datum,
- characterized in that the test is re-executed upon each positive comparison, and in that the test is executed at least a number M of times, M being greater than or equal to 2.

A method according to the first aspect makes it possible to appreciably improve the reliability of the integrity tests, with optimal additional computation cost.

For example, said number M lies between 2 and 7.

Said number M is advantageously equal to 7.

For example, said first step is the encryption of said initial datum with the public key and said second step is the decryption of the first result with the private key.

According to embodiments, said integrity test furthermore comprises, in case of positive comparison between said second result and of said initial test datum:
- a third step of encrypting said second result, said third. step making it possible to generate a third result,
- a comparison of said third result and of said first result.

For example, said first step is the signing of said initial datum with the private key and said second step is the verification of the first result with the public key.

Said integrity test comprises for example furthermore, in case of positive comparison between said second result and of said initial test datum:
- a fourth step of decrypting said second result, said fourth step making it possible to generate a fourth result,
- a comparison of said fourth result and of said first result.

For example, random messages are implemented upon each re-execution.

For example, messages different from 0 and different from 1 are implemented upon each re-execution.

For example, the method is implemented in an electronic device in relation to a combination of side channel attack and of an attack by fault injection, said combination being implemented during the execution of a cryptographic method implementing a pair of cryptographic keys.

A second aspect of the invention relates to a method of testing security of an electronic device in relation to an attack, said device implementing a generation of a public cryptographic key e and a private cryptographic key d in the additive group of integers modulo n, such that:

n=p·q, with p and q being prime numbers, $1<e<\Phi(n)$, with e and $\Phi(n)$ being mutually prime and $\Phi(n)=(p-1)\cdot(q-1)$, and d·e=1 mod λ(n), λ(n) being the least common. multiple between p−1 and q−1, the method comprising a step of perturbation of the computation of the value λ(n), so as to obtain, instead of the value λ(n), a value λ'(n)=λ(n)/α, with a dividing λ(n), said perturbation leading to the computation of a private key d', instead of the private key d such that d'·e=1 mod λ(n)/α.

A method according to the second. aspect makes it possible to test electronic devices implementing a generation of key pairs, by verifying their reaction in relation to the perturbation of the computation of the least common multiple.

A method according to the second aspect can be implemented in the industrial process of testing electronic devices implementing cryptographic key generation, for example in the test laboratory. Said perturbation step can make it possible to highlight a vulnerability in the resistance to an erroneous computation of the value λ(n).

A third aspect of the invention relates to a computer program as well as to a computer program product and a storage medium for such program and product, allowing the implementation of a method according to the first or the second aspect when the program is loaded and executed by a processor of an electronic device, for example a cryptographic device.

A third aspect relates to an electronic device, for example a cryptographic device, configured for the implementation of a method according to the first or the second aspect.

For example, a device according to the third aspect is a portable electronic entity.

The device according to the third aspect can be a chip card.

Other types of devices can be envisaged, especially security documents (electronic passport, electronic identity cards or the like), USE keys, mobile telephones or "smartphones".

BRIEF DESCRIPTION OF THE DRAWINGS

Other advantages, aims and characteristics of the present invention emerge from the detailed description. which follows, given by way of nonlimiting example, in regard to the appended drawings in which.

DETAILED DESCRIPTION OF THE PREFERRED EMBODIMENTS

Hereinafter, embodiments are described. However, in a prefatory manner, there is described a method of testing integrity of generation of cryptographic key pairs. This test method can be used for cryptographic keys used in encryption and/or digital signature mechanisms. Thus, this method can be used even before knowing the subsequent use of the generated key pair.

It is assumed that a public cryptographic key (e, n) and a private cryptographic key (d, n) are generated such that:

n=p·q, with p and q being prime numbers, $1<e<\Phi(n)$ and e and $\Phi(n)$ are mutually prime (gcd(e, $\Phi(n))=1$), with $\Phi(n)=(p-1)\cdot(q-1)$ ($\Phi$ being the Euler indicator function, or "totient" as it is termed), and d·e=1 mod λ(n), λ(n) being the least common. multiple between p−1 and q−1 (λ(n)=1 cm(p−1, q−1)).

Figure 1:
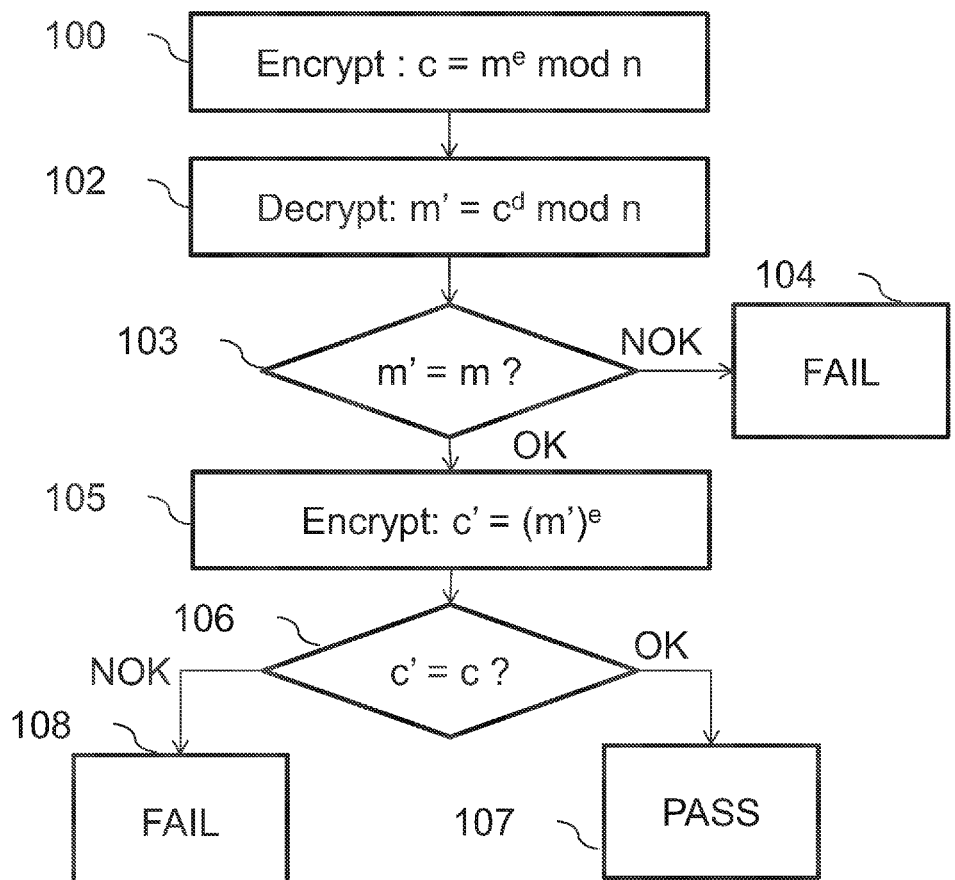
FIG. 1 illustrates a method of testing integrity of generation of keys.

Thereafter, as illustrated by FIG. 1, during a first step 100 a message m (m belonging to $Z_n$, the additive group of integers modulo n), is encrypted with the public exponent e so as to obtain a first encrypted message $c=m^e$ mod n. Thereafter, during step 102, the encrypted message c is decrypted with the private key d so as to obtain a decrypted message $m'=c^d$ mod n.

It is thereafter verified, during a step 103, whether the initial message m and the decrypted message are the same (m'=m). If this is not the case (NOK), it is determined during step 104 that the key pair generated is corrupted. If on the other hand the initial message m and the decrypted message are the same (OK), the decrypted message m' is encrypted, during a step 105, with the public exponent e so as to obtain a second encrypted message $c'=(m')^e$ mod n.

It is thereafter verified, during a step 106, whether the first encrypted message c and the second encrypted message c' are the same (c'=c). If such is the case (OK), it is determined during step 107 that the integrity test is successful. Otherwise (NOK), it is determined, during step 108, that the key pair generated is corrupted.

Certain corrupted key pairs may successfully pass the integrity tests such as that described hereinabove or other tests of the prior art.

For example, if, instead of generating the private exponent d, there is generated a number d' such that:

d'·e=1 mod λ(n)/α,

1≤α,

α divides λ(n), it may happen that for some messages, the key pair with the numbers d' and e passes the test successfully whereas an error has occurred in the private exponent d.

In addition to being a source of errors for a cryptographic system using the keys, this may be a source of attacks by malicious third parties.

For example, the number d' may be generated by error if the computation of the least common multiple of p−1 and q−1 (which must normally give λ(n)) is marred by an error. The number d' may be computed by implementing Euclid's algorithm. The integers a and b are computed so that e·a+b. λ(n)/α=1 (Bezout relation). The number d' is then obtained as d'=a mod λ(n)/α. Under these conditions, we do indeed have d'·e=1 mod λ(n)/α.

By causing the determination of the number d' instead of the number d, an attacker can thus retrieve one of the secret factors (p and q) of the number n such that n=p·q.

Indeed, let us assume that the integer α divides the number $$\frac{(q-1)}{gcd(p-1, q-1)}$$

without however dividing the number $$\frac{(q-1)}{gcd(p-1, q-1)},$$

then, denoting by t the number such that $$t = \frac{(q-1)}{\alpha \cdot \gcd(p-1, q-1)},$$

we obtain $d = e^{-1} \mod t$. $(p-1)$.

Thus, the private exponent is the inverse of the public exponent in the ring $Z_{p-1}$ of the ring $Z_{\lambda(n)}$.

For a random message m, we then have:
$(m^d)^e = m \mod n$,
but we also have
$(m^d)^e = m \mod p$.
A multiple of the factor p can thus be obtained as
$(m^d)^e - m \mod n$.

An attacker can thus perturb the generation of keys and request the signature of random messages. For certain messages m, the signature s obtained is such that $\gcd(s^e - m, n)$ gives a factor of n.

Let us assume that the least common multiple of $p-1$ and $q-1$ is computed as follows, $$\lambda(n) = \frac{(p-1) \cdot (q-1)}{\gcd(p-1, q-1)},$$

with $\gcd(p-1, q-1)$ being the greatest common divisor of $p-1$ and $q-1$. If the computation of this greatest common divisor gives $\alpha \cdot \gcd(p-1, q-1)$ (the product of a times $\gcd(p-1, q-1)$) instead of $\gcd(p-1, q-1)$, then d' is computed instead of computing d.

The inventors have noted that the integrity tests currently used might not detect certain errors when generating pairs of keys, especially during attacks such as mentioned hereinabove.

An attacker can cause errors in the computation of the private exponent by side channel observation of the operation of the device implementing the key generation and then by physical attack of the device so as to perturb this operation. The attacker may for example use lasers to perturb the device or else perturb the latter's electrical power supply.

By way of illustration, if an error $\alpha$ (such as mentioned. hereinabove) is introduced so that the number a divides the value $k \cdot \lambda(n)/\alpha$ (k being an integer), and that the number d' is determined in place of the number d such that $d' \cdot e = 1 + k \cdot \lambda(n)/\alpha$ then an integrity test, such as for example defined in FIPS standard 140-2, executed on a message m of order s does not make it possible to detect the error if s divides $k \cdot \lambda(n)/\alpha$ whereas it does make it possible to detect it if s does not divide $k \cdot \lambda(n)/\alpha$. It is recalled that the order s of the message m in the additive group is the number of times that it is necessary to add together the message m to obtain 1.

Indeed, let e, p and q be RSA parameters with $n = p \cdot q$. if $d' = e^{-1} \mod \lambda(n)/\alpha$ is the erroneous exponent, the correct exponent being $d = e^{-1} \mod \lambda(n)$, if d' is different from d then $\exists m \in Z_n^+$ such that $(m^e)^{d'} \neq m \mod n$. Moreover, if $\forall m \in Z_n^+$ we have $(m^e)^{d'} = m \mod n$ then $d = d'$. The proof of this is possible but is not presented here for the sake of conciseness.

Hereinafter, there is described a method making it possible to render the integrity tests sensitive to errors of this type. The integrity tests may be implemented. during or after the generation of the keys.

Figure 2:
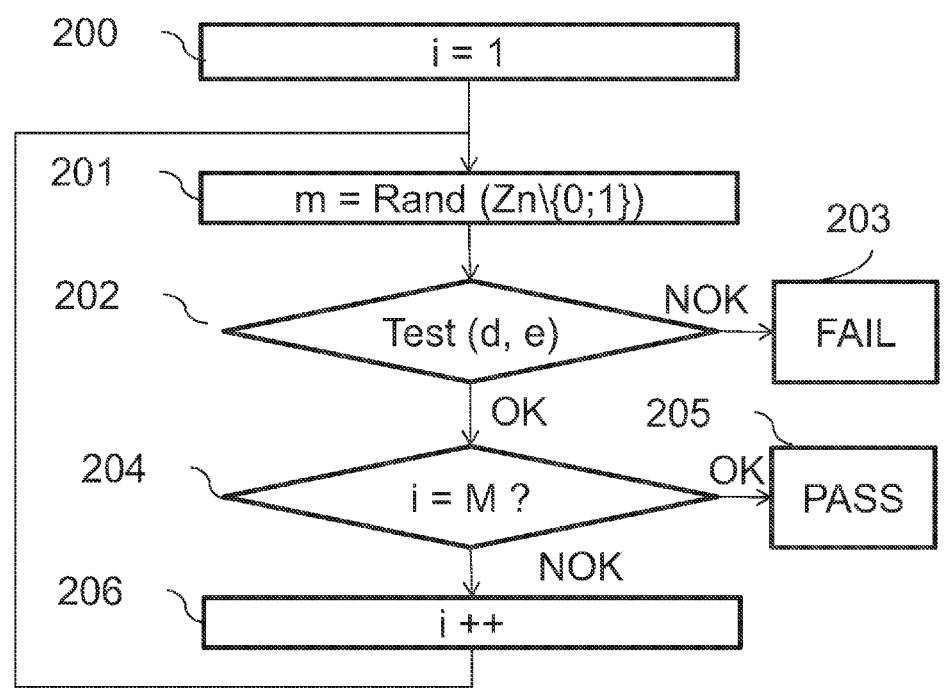
FIG. 2 illustrates a method of verifying integrity of keys.

With reference to FIG. 2, there is described a method of testing integrity of cryptographic key pairs. The method consists in repeating a certain number of times M, an integrity test, such as for example that described. with reference to FIG. 1 on the basis of different messages. For example these are random messages. These messages must be different from 0 and from 1.

The inventors have determined that, for example, for a number M=7 repetitions with different messages, fewer than 1% of the corrupted key pairs passed the test. There is thus a probability of more than 99% of detecting non-integrity of a key pair, and this without necessarily using new tests. The multiplication of the cost of computation by M is acceptable in view of the reliability level of the test (99%).

During a step 200, a counter i is initialized to the value 1. Thereafter, during a step 201, a message m different from 0 and from 1 is drawn randomly in the set $Z_n$.

An integrity test, for example such as described with reference to FIG. 1, is thereafter implemented during a step 202.

If the test is not satisfied (NOK), it is determined during a step 203 that the key pair is corrupted. If on the other hand the test is satisfied (OK), it is tested during a step 204 whether the counter is equal to the value M.

If such is the case (OK), the test of step 202 has been executed the number M of times and it is determined during step 205 that the key pair is not corrupted. If on the other hand the counter i has not reached the value M (NOK), the counter is incremented during step 206 and the process returns to step 201.

The inventors have obtained the following results:

| Number of actually erroneous keys out of 10000 perturbed key generations | Rate of detection with 1 message | Rate of detection with 2 messages |
| --- | --- | --- |
| $\alpha = 2$ | 5 057 | 58.4% | 81.3% |
| $\alpha = 3$ | 6 683 | 70.3% | 90.5% |
| $\alpha = 4$ | 7 506 | 72.7% | 90.0% |
| $\alpha = 5$ | 7 976 | 81.6% | 96.4% |
| $\alpha = 6$ | 8 206 | 75.0% | 91.8% |
| $\alpha = 7$ | 8 597 | 86.5% | 98.1% |
| $\alpha = 8$ | 8 705 | 82.4% | 94.7% |

When the error $\alpha$ (mentioned hereinabove) is 2 ($\alpha = 2$), the inventors have obtained the following results:

| | Number of messages | | | | | | |
| --- | --- | --- | --- | --- | --- | --- | --- |
| | 1 | 2 | 3 | 4 | 5 | 6 | 7 |
| Rate of detection | 8.4% | 1.3% | 1.1% | 5.7% | 7.9% | 8.9% | 9.5% |

A number of 7 repetitions with different messages is thus advantageous. However, it is possible to employ a number of repetitions of from 2 to 6 (that is to say 2, 3, 4, 5 or 6).

Figure 3:
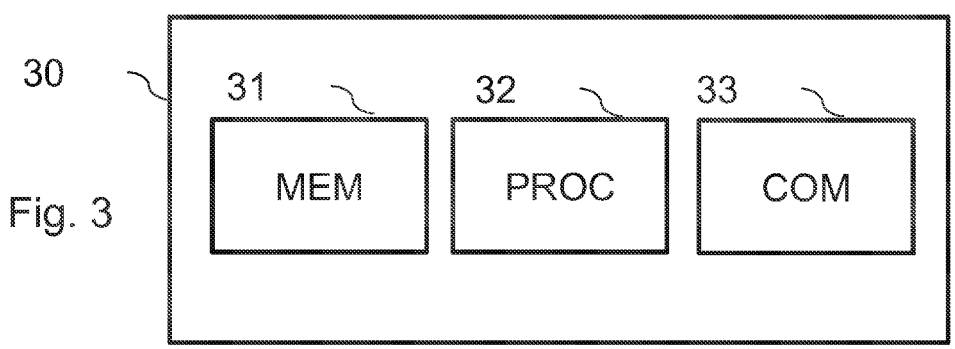
FIG. 3 schematically illustrates a device according to embodiments.

FIG. 3 schematically illustrates a device according to embodiments.

The device 30 of FIG. 3 comprises a memory unit (MEM). This memory unit comprises a. random-access memory for storing, in a non-enduring manner, computation data used during the implementation of a method in accordance with the invention, according to diverse embodiments. The memory unit moreover comprises a nonvolatile memory (for example of the EEPROM type) for storing for example a computer program, according to an embodiment, for its execution by a processor (not represented) of a processing unit 31 (PROC) of the device.

The device moreover comprises a communication unit 33 (COM), for example for exchanging data with another device in accordance with embodiments. Data exchanges between devices may be realized according to the APDU protocol, the initials standing for "Application Protocol Data Unit", such as defined in ISO standard 7816 part 4.

The communication unit can thus comprise an input/output interface able to exchange according to this protocol. The data exchanged may be realized by APDU commands and responses to commands of this type.

A device according to embodiments may be in accordance with the standard ISO7816. It may for example be a chip card or a secure element.

A device according to embodiments is for example an integrated circuit.

The present invention has been described. and illustrated in the present detailed description with reference to the attached figures. However, the present invention is not limited to the embodiments presented. Other variants, embodiments and combinations of characteristics may be deduced and implemented by the person skilled in the art on reading the present description and appended figures.

In the claims, the term "comprise" does not exclude other elements or other steps. The indefinite article "a" does not exclude the plural. A single processor or several other units may be used to implement the invention. The various characteristics presented and/or claimed may advantageously be combined. Their presence in the description or in different dependent claims does not in fact exclude the possibility of combining them. The reference signs should not be understood as limiting the scope of the invention.

The invention claimed is:

1. A method carried out by an electronic computing device for encrypting or digitally signing data using a pair of public and private cryptographic key pairs, the method comprising:
   generating, within the electronic computing device, and storing, in a memory of the device, a pair of public and private cryptographic keys;
   verifying, by the device, an integrity of the pair of public and private cryptographic keys stored in the memory, the verifying comprising:
      executing an integrity test by a hardware processor of the device, the integrity test comprising:
         a first step of signing or encrypting, by the hardware processor, an initial test datum using the private cryptographic key or the public cryptographic key of the public and private cryptographic key pairs, respectively, to generate a first result therefrom;
         a second step of decrypting or verifying, by the hardware processor, said first result using the private cryptographic key or the public cryptographic key of the public and private cryptographic key pairs, respectively, to generate a second result therefrom; and
      comparing, by the hardware processor, said second result and said initial test datum,
   wherein, upon said comparing step being positive such that said second result and said initial test datum match, said integrity test is re-executed by the processor,
   wherein said integrity test is repeatedly executed, as a loop, up to a finite maximum number M, M being at least equal to 2, said loop exiting upon detection of a failure of the integrity according to a threshold of a reliability level,
   wherein the first step and the second step are performed within a same hardware processor of said electronic computer device,
   wherein, for each execution of the integrity test, a new initial test datum is drawn randomly, by the hardware processor, for use in the first step of each re-execution of the integrity test, and further, the initial test datum of said first step is both different from 0 and different from 1; and
   in response to the pair of cryptographic keys being verified to have integrity with respect to the finite maximum number of executions of said integrity test for securely preventing from at least a side channel attack, encrypting or digitally signing data using one key of the verified pair of cryptographic public and private keys.

2. The method according to claim 1, wherein said finite maximum number M is between 2 and 7.

3. The method according to claim 1, wherein said finite maximum number M is equal to 7.

4. The method according to claim 1, wherein said integrity test furthermore comprises:
   in response to said comparing step between said second result and said initial test datum being positive, the following further steps are carried out:
      a third step of encrypting said second result thereby generating a third result, and
      a comparison of said third result and of said first result.

5. The method according to claim 1, wherein said integrity test furthermore comprises:
   in response to said comparing step between said second result and said initial test datum being positive, the following further steps are carried out:
      a fourth step of decrypting said second result, thereby generating a fourth result, and
      a comparison of said fourth result and of said first result.

6. The method according to claim 1, implemented in the electronic device in relation to a combination of the side channel attack and an attack by fault injection, said combination being implemented during the execution of a cryptographic method implementing a pair of cryptographic keys.

* * * * *